July 13, 1965 W. T. RHODES 3,194,519

AERIAL DEVICE WITH RETARDING ROTOR

Filed Dec. 11, 1962 6 Sheets-Sheet 1

INVENTOR
WESLEY T. RHODES

BY
Teller, McCormick, Paulding & Huber
ATTORNEYS

AERIAL DEVICE WITH RETARDING ROTOR

Filed Dec. 11, 1962 6 Sheets-Sheet 2

July 13, 1965 W. T. RHODES 3,194,519

AERIAL DEVICE WITH RETARDING ROTOR

Filed Dec. 11, 1962 6 Sheets-Sheet 3

FIG. 4
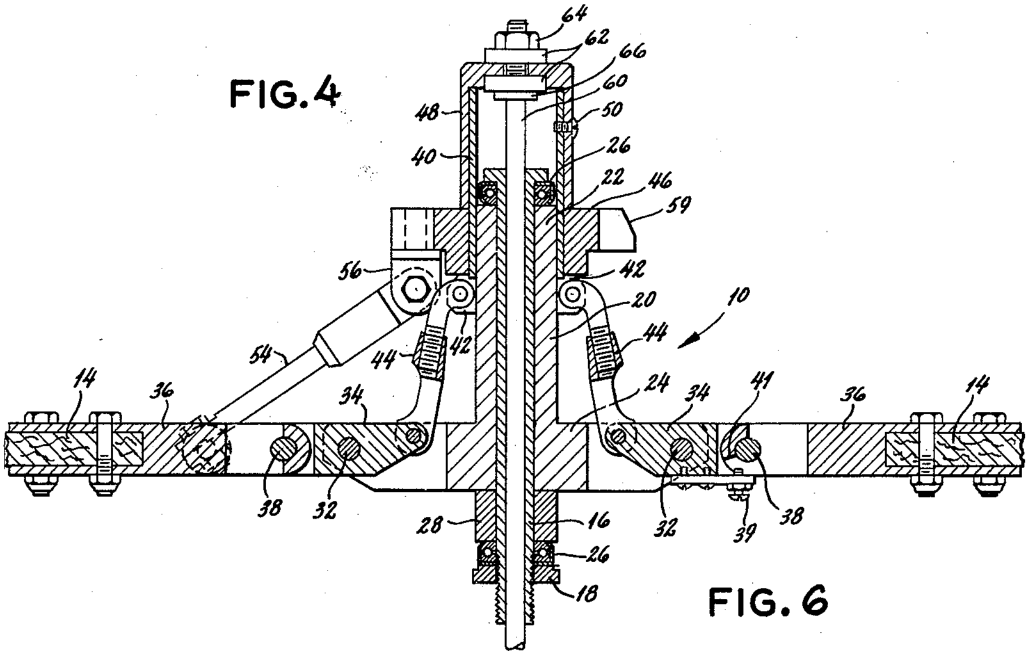
FIG. 6
FIG. 5
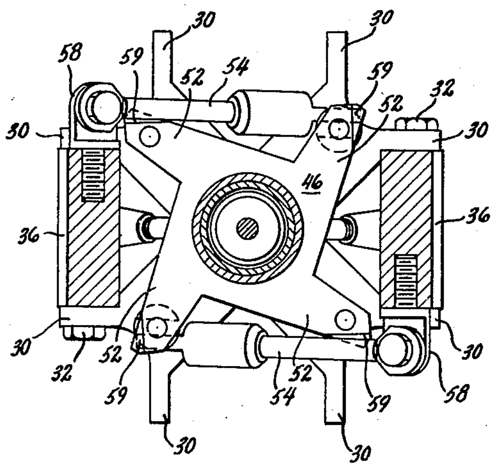
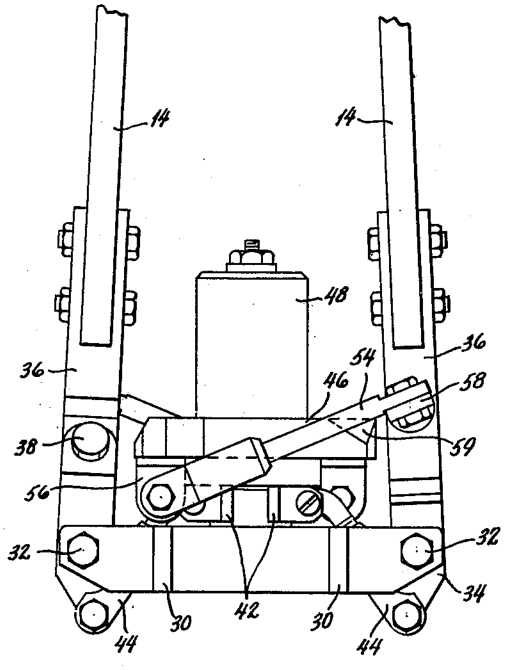

July 13, 1965 W. T. RHODES 3,194,519

AERIAL DEVICE WITH RETARDING ROTOR

Filed Dec. 11, 1962 6 Sheets-Sheet 5

July 13, 1965 W. T. RHODES 3,194,519

AERIAL DEVICE WITH RETARDING ROTOR

Filed Dec. 11, 1962 6 Sheets-Sheet 6

3,194,519

AERIAL DEVICE WITH RETARDING ROTOR

Wesley T. Rhodes, Windsor Locks, Conn., assignor to Kaman Aircraft Corporation, Bloomfield, Conn., a corporation of Connecticut Filed Dec. 11, 1962, Ser. No. 243,790
24 Claims. (Cl. 244—138)

This invention relates to an aerial device having a rotor for retarding the speed of flight of a body to which the device is attached, and deals more particularly with such a device which may be used as a rotary parachute to slow the descent of a falling body or as a rotary drogue for slowing the forward speed of an aircraft.

A device embodying the invention may be called a rotary blade parachute or drogue. As a parachute it is adapted for the controlled safe delivery to the ground of supplies or equipment or an article or mechanism from an aircraft or otherwise from an elevated position. The device may be carried on an aircraft and released therefrom and said device may be connected to a container or body constituting or adapted to carry a useful load, but in these respects the invention is not necessarily limited. A device embodying the invention is adapted for use at various speeds including those in the supersonic range and it may be released at either a high altitude or a low altitude after which it descends in a stable attitude. As disclosed herein, the device may also be attached to a space vehicle and used to slow the descent of such vehicle after its re-entry into the atmosphere. As a drogue, a device embodying this invention may be attached to an aircraft and used to slow the forward speed of the same during landing or to aid in the execution of other maneuvers. When used as a drogue one important feature of the device is that its deployment may be controlled at will and the blades moved in any direction between retracted, fully deployed and partially deployed positions so as to have a drag modulating effect on the aircraft.

The general object of this invention is to provide an improved aerial retarding device, and more particularly to provide such a device which is of simple construction and has various functional advantages over prior devices of the same general type.

A more specific object of this invention is to provide an aerial device including a rotor for slowing the speed of an attached body and in which device the blades of the rotor are movable from inactive positions to deployed positions in such a manner as to avoid high shock loads which heretofore have resulted in blade breakage and undesirable high acceleration loading on the payload. In keeping with this object, another object is to provide a device of the type described wherein the blades may be deployed in a high velocity air stream.

Another object of this invention is to provide a rotary blade aerial device including means for controlling the speed of rotor rotation, or rotor tip speed, in such a manner that the tip speed may be maintained substantially constant or at least below a given maximum value under all flight conditions so that high centrifugal loads are avoided thereby allowing the use of relatively light blades.

Another object of this invention is to provide a rotary blade aerial device for retarding the descent of an attached body and wherein the blades are attached to a central hub for flapping movement about axes each of which is disposed at a delta-three angle to a line perpendicular to a radial plane passing through the inboard end of the associated blade so that changes in the coning angle of each blade produce changes in its pitch to effect an automatic governing action on the speed of rotation, the device further including means for shifting the flapping axes to change the delta-three angles and to thereby permit control of the speed of rotation at different speeds of longitudinal motion.

Another object of this invention is to provide a device of the type set forth above wherein the blades after deployment may be fully or partially returned to their inactive positions while the device is in flight to fully or partially remove the retarding force and wherein the movement of the blades between their inactive and deployed positions is controllable from the body to which the device is attached.

A further object of this invention is to provide a device of the type set forth above including a novel blade retention and associated means whereby the speed of rotor rotation and the pitch of the blades are so interrelated as to automatically provide for an optimum retarding force during autorotation of the rotor.

Other objects and advantages will be apparent from the following description and from the drawings forming a part thereof.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

Of the drawings:

FIG. 4 is a longitudinal sectional view taken on the line 4—4 of FIG. 3.

FIG. 5 is a transverse sectional view taken on the line 5—5 of FIG. 2 and in which view two of the blades and other associated parts have been omitted for clarity.

FIG. 6 is a fragmentary front elevational view of the device as shown in FIG. 5.

*General description of device and manner of operation*

Figure 1:
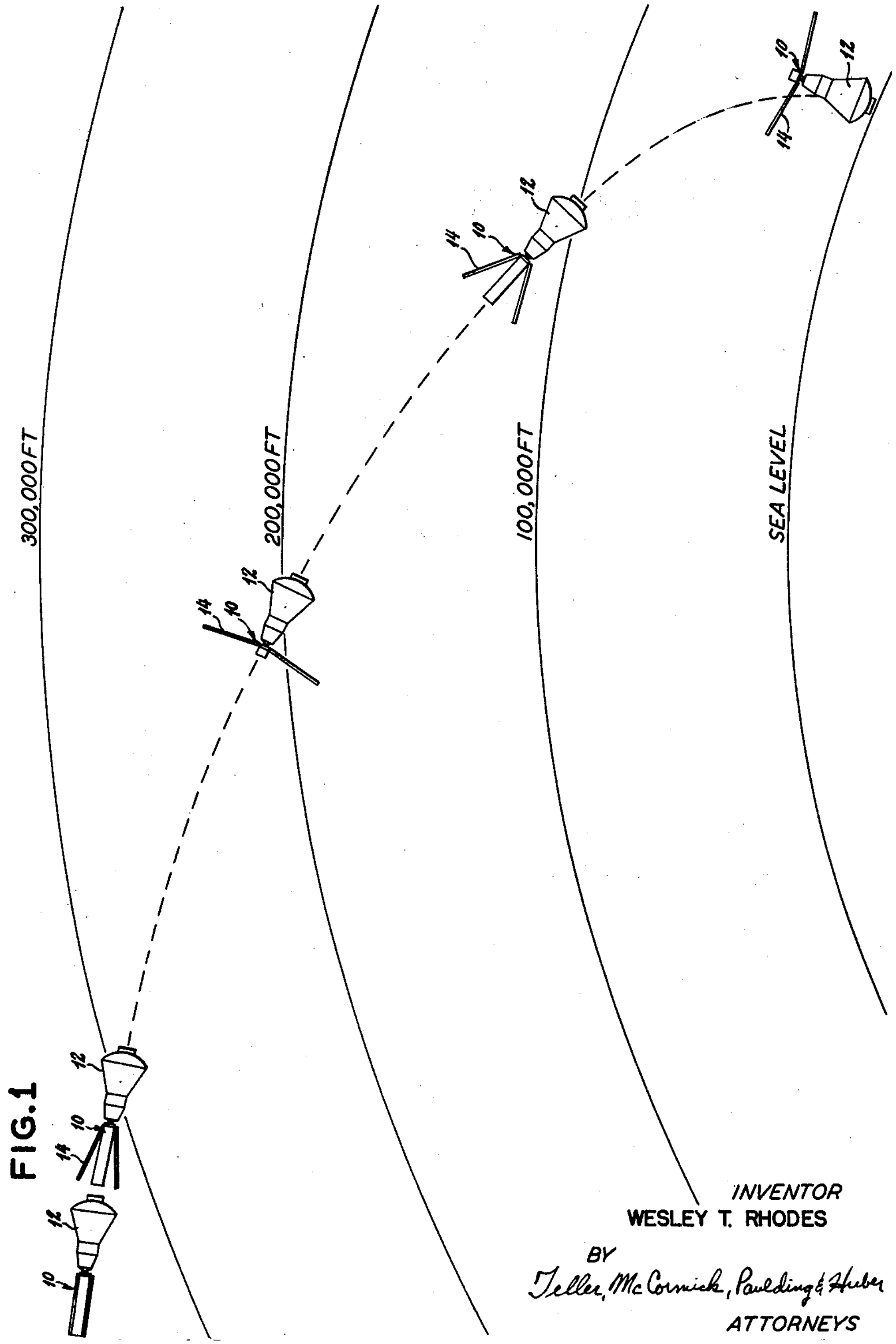
FIG. 1 is a schematic illustration showing a device embodying this invention as applied to a space re-entry capsule and shows the disposition of the blades of the device at various stages of its flight through the atmosphere.

In FIG. 1 of the drawings a rotary blade device embodying the present invention is shown in conjunction with a re-entry space vehicle or capsule, the rotary blade device being shown schematically at 10 and the re-entry capsule being shown schematically at 12. In this figure the broken line represents the path of flight of the capsule during its re-entry into the atmosphere, and the capsule and the attached rotary blade device are pictured at various different altitudes along the flight path.

The device 10 comprises a rotor having a plurality of blades 14, 14 and is supported on the rear end of the capsule with respect to its direction of flight. The blades 14, 14 rotate about a fixed central axis relative to the body and exert an aerodynamic retarding or braking force thereon so as to slow its speed of flight or descent. The blades are movable between inactive positions at which they exert no retarding force on the capsule and fully deployed positions at which they exert a maximum retarding force on the capsule. They are also movable to intermediate or partially deployed positions whereat they exert less than the maximum possible retarding force on the capsule.

If desired, and as shown in FIG. 1, the disposition of the blades 14, 14 may be so programmed or controlled that the device exerts a deceleration force on the capsule which is either constant or which does not exceed a predetermined maximum. For example, in FIG. 1 the first view in the upper left-hand corner shows the device 10 with its blades 14, 14 in their inactive positions. As the capsule reaches an altitude of about 300,000 feet the blades are released from their initial or inactive positions for movement toward their deployed positions. The illustration at the 300,000 foot level shows the blades 14, 14 shortly following their release and before movement to the fully deployed positions. Since the air between the 300,000 and the 200,000 foot levels is relatively thin the retarding force produced by the device 10 is small even with the blades fully deployed and therefore the blades are moved to their fully deployed positions in order to obtain the maximum retarding force available. The view at the 200,000 foot level shows the blades at or near their fully deployed positions whereat the blades extend generally radially outwardly from the central axis of rotation. As the capsule falls below the 200,000 foot level it encounters denser air which increases the effectiveness of the retarding device. If the blades were left in their fully deployed positions the denser air combined with the still high velocity of the capsule could cause undesirable high deceleration or braking forces to be applied to the capsule and to the retarding device itself. To overcome this the blades are or may be partially retracted toward their inactive positions to decrease the included coning angle of the blades and to reduce the retarding force produced and exerted by the device 10 on the capsule 12. The view at the 100,000 foot level shows the device 10 with its blades in such intermediate or partially retracted positions. By the time the capsule 12 reaches an altitude of about 100,000 feet its speed has been reduced to the point where the blades 14, 14 may again be fully deployed without producing undesirably high retarding forces. Consequently the blades may be moved to fully deployed positions at or below this altitude and thereafter act to slowly lower the capsule 12 through the lower regions of the atmosphere to a soft landing. The lower figure in FIG. 1 shows the device 10 with its blades 14, 14 fully deployed just prior to landing.

Although the device 10 is shown and described herein as being attached to a space capsule 12 for controlling its re-entry into the atmosphere it is to be understood that it is not limited to this use and may be used as a retarding mechanism to slow the flight of aircraft or as a parachute to safely deliver to the ground cargo or the like dropped from an aircraft or otherwise from an elevated position. When used as a retarding device for an aircraft the device 10 can be controlled in the same manner as described above in connection with the capsule 12 to exert a retarding force on the aircraft which is constant or less than a predetermined maximum, or it may be under the direct control of the pilot so that the retarding force or drag may be modulated or varied at will.

*More specific description of device*

Reference is now made to FIGS. 2 to 8, inclusive, for a more specific description of the rotary blade retarding device 10. For clarity, some parts will sometimes be referred to hereinafter as horizontal and vertical, and other relative terms such as upper and lower and above and below will sometimes be used, reference in all these instances being had to the device as oriented in FIG. 2, 4, 6 and 8.

Figure 2:
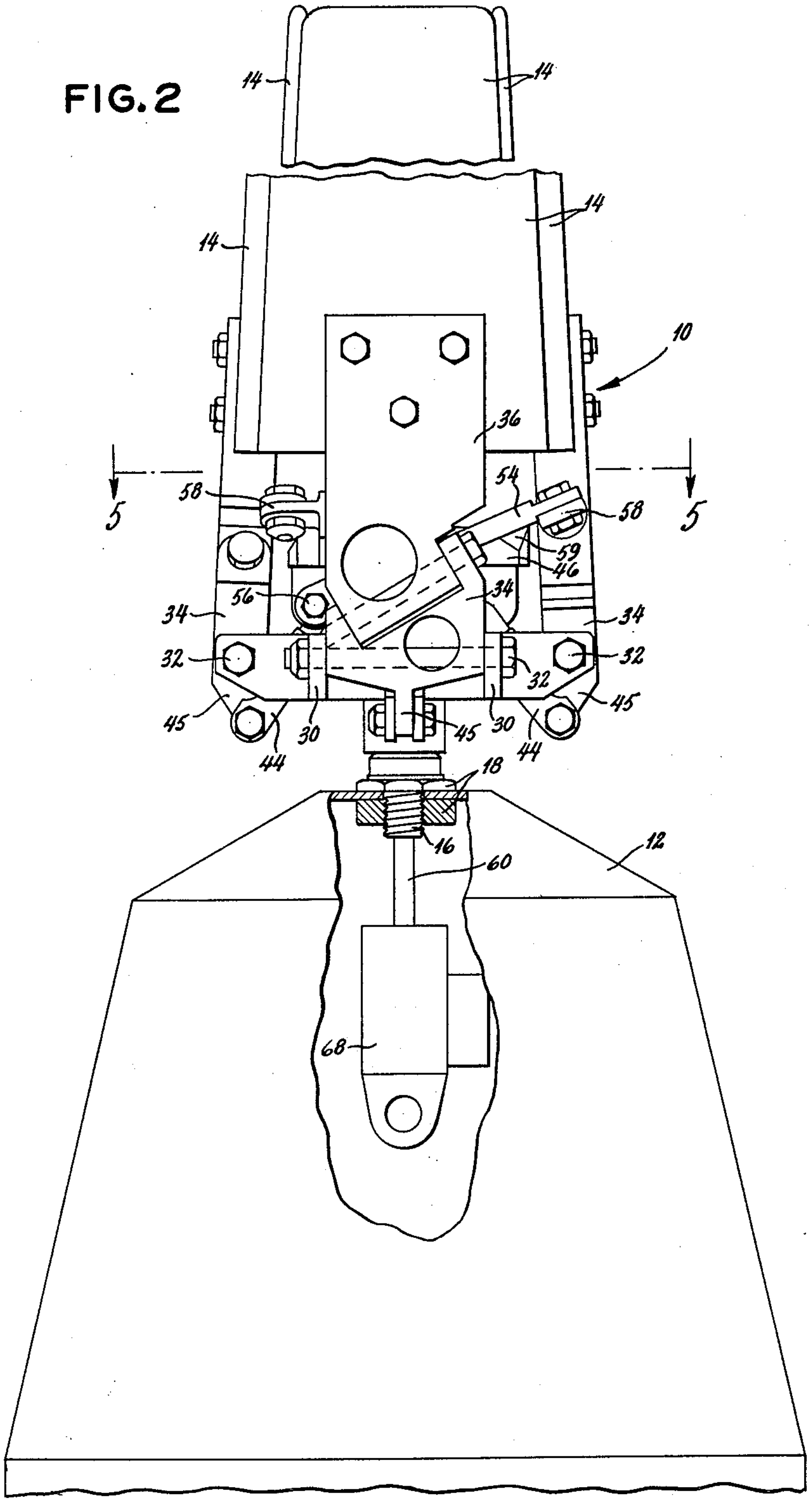
FIG. 2 is a fragmentary side elevational view of the rotary blade device of FIG. 1 and in which view the blades are shown in their inactive positions.
Figure 3:
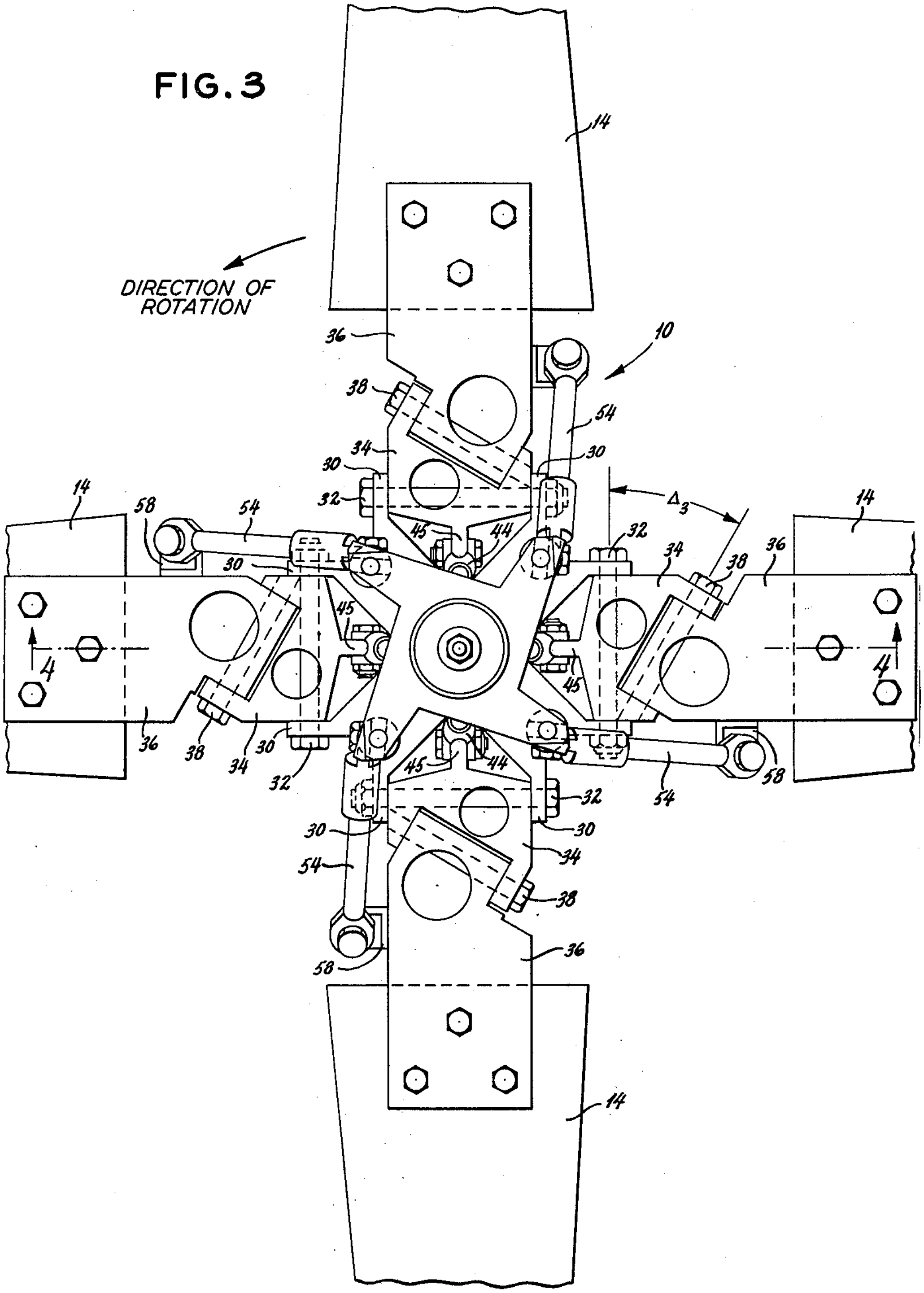
FIG. 3 is a fragmentary plan view of the rotary blades device of FIG. 1 and in which view the blades are shown in their deployed positions.
Figure 7:
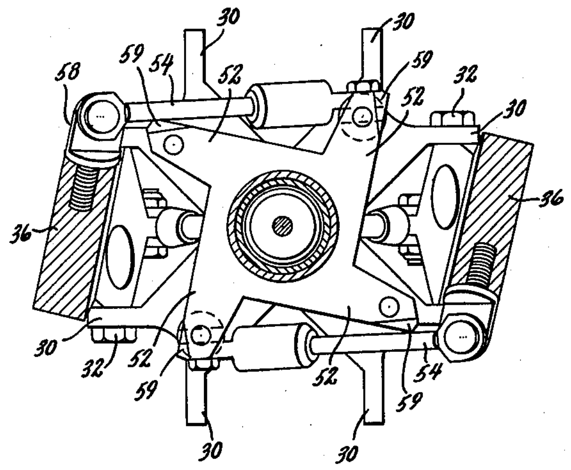
FIG. 7 is a view generally similar to FIG. 5 but shows the blades of the device in the positions occupied at the end of the initial phase of their deployment.
Figure 8:
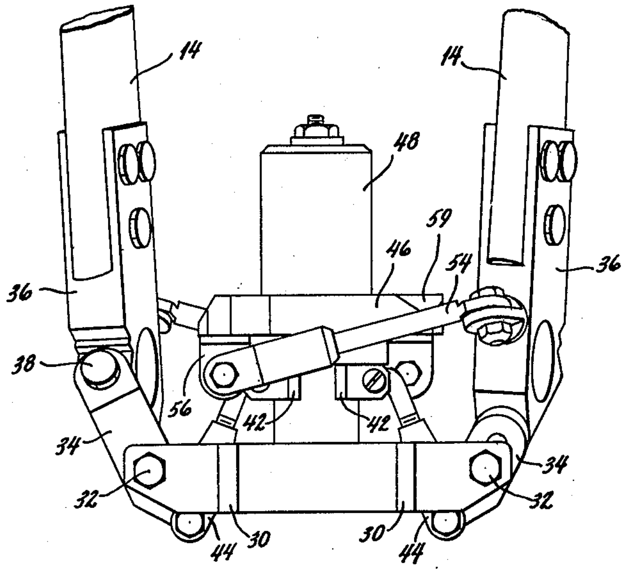
FIG. 8 is a fragmentary front elevational view of the device as shown in FIG. 7.

Referring first to FIGS. 2, 3 and 4, the illustrated device 10 is shown to include four blades 14, 14 which are equally angularly spaced about a common central axis. This number of blades has been chosen for the purpose of illustration only and the rotor may have two, three or more blades without departing from the invention. As before mentioned, the device 10 is attached to the space capsule 12 or other body and the blades 14, 14 are adapted for rotation about the central axis which is fixed relative to the capsule. As best shown in FIGS. 2 and 4, the means for attaching the device to the capsule comprises a fixed hollow shaft 16 which is secured to the capsule 12 by suitable means such as two nuts 18, 18 threadably engaged with the lower end portion of the shaft. The central axis of the shaft 16 constitutes the central axis of rotation of the blades and the blades are supported for rotation about such axis by means of a hub 20 rotatively supported on the shaft. In the present instance the hub 20 comprises an axially elongated member having a cylindrical upper portion 22 and a lower flange portion 24. The hub 20 has an axial bore which receives the hollow shaft 16 and is held in place axially relative to the shaft 16 by upper and lower thrust bearings 26, 26. Between the lower thrust bearing 26 and the hub 20 is a spacer 28. In the illustrated case the bore in hub 20 is of substantially the same size as the outside diameter of the hollow shaft 16 so that the connection between the hub and the hollow shaft is in the nature of a simple sleeve bearing. This construction is simple and inexpensive, but if desired radial anti-friction bearings could be used between the hub and the shaft to reduce the amount of torque transmitted to the shaft 16 and to the capsule 12 by rotation of the rotor.

The inboard or lower ends of the blades 14, 14 are connected with the hub 20 for movement between inactive and deployed positions and the means for connecting each blade to the hub is such that the blade is movable relative to the hub about two different pivot axes. Movement of the blades about one set of axes in general moves the blades between their inactive and deployed positions and determines the basic coning angle of the blades. Other pivotal movement of the blades occurs about the second set of axes. This latter movement is in the nature of a flapping movement and causes the blades to move upwardly or downwardly from the basic coned positions determined by movement about the first set of axes. For this reason the first set of axes are some times referred to herein for convenience as coning axes and the second set of axes are sometimes referred to as flapping axes even though movement about the second set of axes also effects the coning angle. Coordinated with the movement of the blades about the flapping axes is the pitch of the blades which is controlled in response to the flapping motion in such a manner that as the blades move upwardly about the flapping axes toward larger coning angles the pitches of the blades are decreased and as they move downwardly toward smaller coning angles the pitches are increased. As a result of this an automatic governing action is imparted to the rotor as hereinafter described. As used herein, the coning angle of a blade is considered to be measured from the blade to a plane normal to the central axis so that when the blade extends perpendicular to the central axis the coning angle is zero and when the blade is parallel to the central axis the coning angle is 90°.

In the present instance the lower flange portion 24 of the hub, as best seen in FIG. 5, includes four pairs of radially extending arms 30, 30, the two arms of each pair being generally parallel and provided with transversely aligned openings for receiving coning pivot pins 32, 32. Pivotally secured to each pivot pin 32 and located between the associated arms 30, 30 is a retaining link 34. Generally outboard of the associated pivot pin 32 each retaining link 34 is pivotally connected with the inboard end of a respective one of the blades 14, 14. This latter connection is accomplished by means of a retention member 36 fixed to the inboard end of the associated blade body and by a flapping pivot pin 38 which passes through the retaining link and the retention member and, as shown best in FIGS. 2 and 3, is inclined relative to the associated pivot pin 32.

The coning pivot pins 32, 32 about which the retaining links 34, 34 move pivotally relative to the hub 20 are arranged horizontally and are tangent to a common cylinder concentric with the central axis of the hub. The angle of inclination between each coning pivot pin 32 and its associated flapping pivot pin 38 as projected on a plane normal to the central axis of the hub is referred to as the delta-three angle, shown in FIG. 3, and for any fixed position of the retaining links the movement of the blades about the axes of the pins 38, 38 produces an effect generally similar to that produced in other rotary blade devices having inclined or delta-three flapping hinges. The direction of inclination of the pivot pins 38, 38 is such relative to the direction of rotation of the blades that upward or rearward flapping movement of the blades 14, 14 toward the central axis produces a decrease in the pitch angle of the blades. As shown in FIG. 3 the device 10 is designed so that the blades 14, 14 rotate in the counterclockwise direction and accordingly the pins 38, 38 are so inclined relative to the pins 32, 32 that the pins diverge in going from the trailing to the leading ends thereof. Movement of the blades about the pivot pins 38, 38 is limited in the upward direction by an adjustable stop screw 39 which is fixed to one of the retaining links 34 as shown in FIG. 4 and is engageable with a stop surface 41 formed on the associated blade retention member. Since the blades move in unison about the pivot pins 38, 38, as hereinafter described, one such stop means is sufficient to limit the upward movement of all four blades, but if desired similar stops means may be provided on each retaining link and retention member.

The movement of the blades 14, 14 from the inactive positions shown in FIG. 2 to the deployed positions shown in FIG. 3, or to any intermediate positions, is controlled primarily by the movement of the retaining links 34, 34 about the axes of the coning pivot pins 32, 32. In moving from the inactive positions to the deployed positions the retaining links 34, 34 are moved from the first or upright positions shown in FIG. 2 to the second or generally radial positions shown in FIG. 3. The movement of the retaining links 34, 34 between these positions or to any intermediate position is so controlled that the links move in unison and to equal extents about the axes of the pins 32, 32. Various suitable means for achieving this common movement of the retaining links may be employed, but in the present instance it comprises a synchronizing member 40 mounted on the hub 20 for axial movement relative thereto and connected by suitable means with each of the retaining links 34, 34 so that the retaining links are moved in unison in response to axial movement of the member 40.

Referring to FIG. 4, the synchronizing member 40 is in the form of a sleeve which surrounds the cylindrical portion 22 of the hub and has at its lower end four pairs of radially extending and laterally spaced arms 42, 42. The member 40 is connected with the retaining links 34, 34 by four coning control links 44, 44 each of which is pivotally connected at its upper end to one pair of arms 42, 42 and is pivotally connected at its lower end to an arm 45 on the inboard end of a respective one of the retaining links.

Movement of the blades 14, 14 about the flapping axes 38, 38 is also synchronized so that the blade motions about these axes occur in unison and to the same extents. The means for accomplishing this synchronizing in the present instance comprises a synchronizing member 46 which is rotatable relative to the hub 20 and to the first synchronizing member 40 and which is movable axially of the hub 20 in unison with the first synchronizing member 40. As shown best in FIG. 4, the synchronizing member 46 in the present instance is located above the arms 42, 42 and rotatable surrounds the member 40. A cap member 48 is located on the member 40 above the member 46 and engages the upper surface of the latter member to hold it axially in place on the member 40. The cap member 48 is in turn fixed to the member 40 by suitable means such as a screw 50 which is passed radially through the two parts.

The second synchronizing member 46 includes four generally radial arms 52, 52 each of which is connected with a respective one of the blades 14, 14 by a flapping control link 54. Each flapping control link 54 is connected at one end to an associated arm 52 of the synchronizing member 46 by a universal connection 56 and is connected to an associated blade at its other end by a universal connection 58, the universal connections 58, 58 being located on the trailing edge sides of the retention members 36, 36. As shown in FIGS. 5 and 6 when the blades 14, 14 are in their inactive positions the flapping control links 54, 54 are clustered about the central axis of the device and are arranged generally tangent to a common circle concentric with the central axis. Also, each link is inclined upwardly from its universal connection 56 to its universal connection 58. On the outboard end of each arm 52 of the synchronizing member 46 is a cam surface 59 which faces and engages the side of the adjacent flapping control link 54. The engagement between the cam surfaces 59, 59 and the links 54, 54 prevents the synchronizing member from rotating in the reverse or clockwise direction as viewed in FIG. 5 and the cam surfaces are further inclined relative to the central axis in such directions that as the outboard universal connections move downwardly relative to the inboard universal connections the synchronizing member is moved in the forward or counterclockwise direction by the camming action between the surfaces 59, 59 and the links 54, 54.

When the blades are deployed the synchronizing member 46 rotates counterclockwise from the position shown in FIG. 5 to another position such as shown in FIG. 3 at which the flapping control links 54, 54 extend generally radially outwardly from the central axis. After the blades are moved to their deployed positions by movement of the retaining links 34, 34 the blades move about the inclined flapping axes 38, 38 in response to changes in the speed of rotation and other disturbances and in so doing the pitches of the blades are changed by the delta three action of the inclined axes in such a manner as to return the speed of rotation to its initial value. At this point it should be noted that the delta-three angle of each blade, at least as used herein, is a projected angle and is measured as the angle between the projection of the flapping axis on a plane normal to the central axis of the hub and a line in the same plane normal to a radial plane passing through approximately the midpoint of the inboard end of the blade. In the presently illustrated device each coning pivot pin 32 is normal to such a radial plane so that the delta-three angle may conveniently be measured as the projected angle between the pivot pin 32 and the associated flapping axis pin 38. The use of coning pivot pins such as shown at 32, 32 is however not essential to the broader aspects of the invention and therefore this convenient method of measuring the delta-three angle may not always be available.

It should also be noted that since the delta-three angle is a projected angle its value will change in accordance with the position of the associated retaining link 34. When the retaining link extends perpendicular to the central axis, as in FIGS. 3 and 4, the delta-three angle is a maximum. As the retaining link is moved about the coning axis 32 and away from the FIG. 3 and 4 position the delta-three angle decreases and becomes zero when the retaining link becomes parallel to the central axis. In other words, pivotal movement of the retaining links about their coning axes shifts the flapping axes 38, 38 relative to the hub in such a manner as to change the delta-three angles of the blades. This is an important advantage in that the value of the delta-three angles effects the governing action on the blade speed and determines the speed at which the blades will rotate for a given velocity of the device longitudinally or in the direction of the central axis. Therefore the blade tip speed may be controlled and kept below a given maximum speed by controlling the positions of the retaining links.

The movement of the retaining links 34, 34 relative to the hub and between first and second positions corresponding to inactive and deployed positions of the blades is preferably controlled by a means located within the capsule 12 or other body to which the device is attached. This control in the present instance is afforded by a control rod 60 which slidably extends through the bore of the hollow shaft 16. At its upper end, the control rod is attached to the cap member 48 by means of two thrust bearings 62, 62 and a nut 64 threadably received on the control rod. The upper thrust bearing 62 is held in place between the nut 64 and the wall of the cap 48 and the lower thrust bearing 62 is held in place between the end wall of the cap 48 and a shoulder 66 formed on the control rod. The two thrust bearings 62, 62 permit the cap member 48 and synchronizing member 40 to rotate relative to the control rod while nevertheless causing the axial movement of the control rod to be imparted to the latter members. Therefore, as the control rod 60 is moved axially in the bore of the fixed shaft 16 the synchronizing member 40 and the coning control links 44, 44 are moved axially of the hub in response thereto. From FIG. 4, it will be understood that movement of the control rod 60 in the upward direction relative to the fixed shaft 16 will move the retaining links 34, 34 toward the illustrated horizontal or second positions corresponding to the deployed positions of the blades 14, 14 and that the downward movement of the control rod will move the retaining links to their upright or first positions corresponding to inactive positions of the blades 14, 14 as shown in FIG. 6.

The lower end of the control rod in FIG. 2 extends into the capsule 12 and is shown attached to an actuator 68 which may be of any convenient type for controlling the movement of the control rod. The actuator may, for example, be preprogrammed to provide for the type of operation pictured in FIG. 1 or may be controlled by an accelerometer to provide for a deceleration force which is constant or less than a predetermined maximum. As an alternative the actuator may be responsive to the longitudinal velocity of the device and operable to shift the retaining links and therefore change the delta-three angles in such a manner as to maintain the rotor speed constant or below a given maximum value. The actuator may also if desired be of a type controlled in response to the manipulation of pilot operable controls so that the operation of the device 10 is under the control of the pilot.

*Manner of operation*

Figure 9:
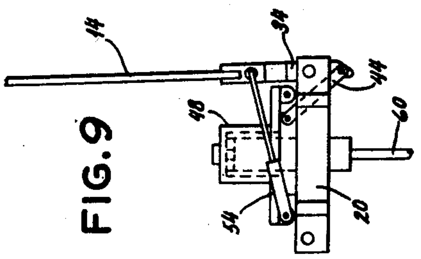
Figure 10:
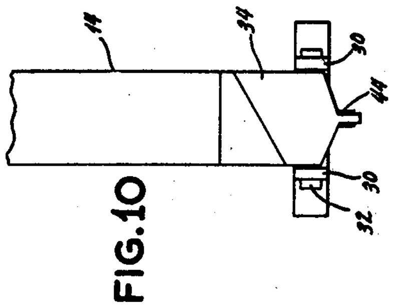

When the device 10 is in an inactive condition the blades 14, 14 and other parts thereof are in the relative positions as shown in FIGS. 2, 5 and 6. FIGS. 9 and 10 also show schematically one blade in the inactive position. To retain the blades in this inactive condition the control rod 60 is held in a lowered position by the actuator. When the blades are in this inactive condition they extend generally parallel to the central axis of rotation and are generally in line with the associated retaining links 34, 34 which are held in upright positions by the coning control links 44, 44. At this time, the flapping control links 54, 54 also engage the cam surfaces 59, 59 on the synchronizing member 46 to prevent reverse or clockwise rotation of the latter member as viewed in FIG. 5 and the links 54, 54 are inclined upwardly in going from the inboard universal connections 56, 56 to the outboard universal connections 58, 58.

When it is desired to deploy the blades 14, 14, the control rod 60 is moved upwardly from the lowered position shown in FIGS. 2 and 9 and as the control rod does so move upwardly it raises both the first synchronizing member 40 and the second synchronizing member 46 relative to the hub 20. The raising of the first synchronizing member 40 raises the attached coning control links 44, 44 and pivots the retaining links 34, 34 about the coning pivot pins 32, 32 in such directions as to cause the upper ends of said retaining links to be swung outwardly. This outward movement of the upper ends of the retaining links likewise moves outwardly the attached flapping pivot pins 38, 38 and therefore also moves outwardly the inboard or lower ends of the blades which are attached to the retaining links by the pins 38, 38.

At the same time as the first synchronizing member 40 is moved upwardly to pivot the retaining links 34, 34 about the pivot pins 32, 32 the second synchronizing member 46 is also moved upwardly in unison with the first member. As a result of this latter movement the inboard universal connections 56, 56 are moved upwardly so as to move the links 54, 54 toward the generally horizontal positions shown in FIGS. 8 and 11. In moving toward such generally horizontal positions the links 54, 54 bear against the cam surfaces 59, 59 on the synchronizing member 46 and not only prevent reverse rotation of the synchronizing member 46 but also through a camming action cause the synchronizing member 46 to move a slight distance in the forward or counterclockwise direction as viewed in FIG. 5. The net result of this movement of the links 54, 54 toward horizontal positions and of the slight forward rotation of the synchronizing member 46 is that the outboard universal connections 58, 58 are moved outwardly away from the central axis of rotation. This outward movement of the universal joints 58, 58 in turn controls the movement of the blades about the pivot pins 38, 38 in such a manner that the outboard ends of the blades 14, 14 are moved outwardly or away from the central axis of rotation along with the outward movement of the inboard ends of the blades. Therefore, during the initial portion of the upward movement of the control rod 60 the blades 14, 14 are retained generally parallel to the central axis.

FIGS. 7, 8, 11 and 12 show the various parts of the device after the initial phase of the blade deployment. At this time the flapping control links 54, 54 are still in contact with the synchronizing member 46 to prevent reverse rotation of the latter, but also at this time the stop surface 41 engages the stop screw 39 to prevent further rotation of the blades 14, 14 about the pins 38, 38 in the upward direction or toward the central axis of the device. Therefore, further upward movement of the synchronizing members 40 and 46 by the control rod 60 causes the coning control links 44, 44 to move the retaining links 34, 34, and the blades 14, 14 outwardly in unison toward smaller coning angles for so long as the stop surface 41 and stop screw 39 remain in the coengagement. During this movement the synchronizing member 46 is moved in the forward direction by the links 54, 54 which move outwardly toward radial positions as a result of the outward movement of the blades.

Figure 11:
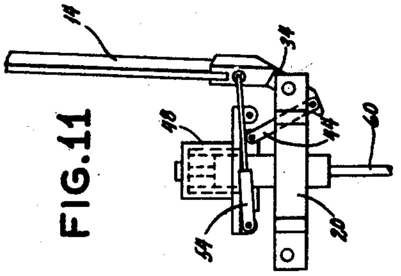
Figure 12:
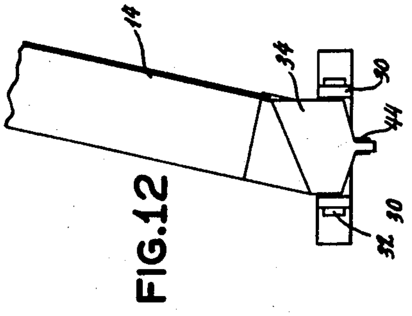

Also, when the blades 14, 14 are in the positions occupied at the end of the initial phase of the deployment, as shown in FIGS. 7, 8, 11 and 12, the blades as a result of being moved relative to the retaining links about the inclined axes 38, 38 are swept forwardly in the direction of intended rotation, as shown best in FIG. 12, and are at negative pitch angles with respect to the intended direction of rotation. Although the blades are generally parallel to the central axis some outward coning is introduced to prevent rotation of the blades in the direction opposite to that intended.

Figures 13, 15:
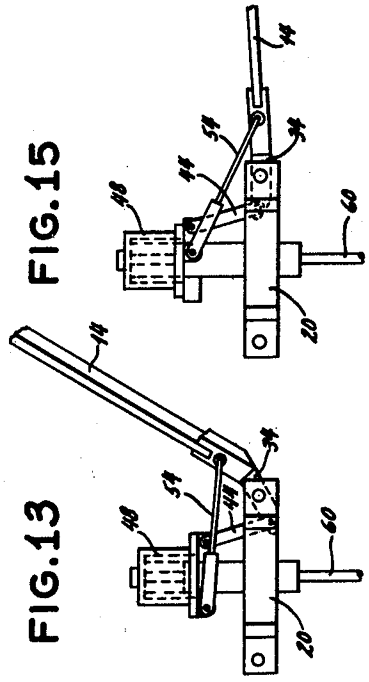
FIGS. 9, 11, 13 and 15 are schematic front elevational views illustrating the positions occupied by one blade and various other parts of the device of FIG. 1 during different periods of its deployment.
Figure 14:
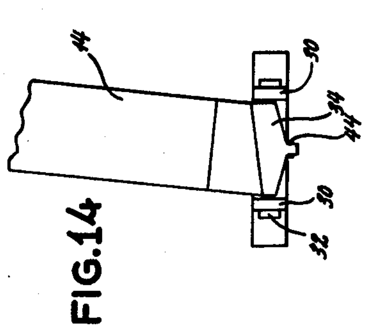

As the control rod 60 is moved upwardly beyond the position illustrated in FIG. 11 the coning control links 44, 44, as mentioned previously, move the retaining links 34, 34 and blades 14, 14 outwardly toward smaller coning angles as shown in FIGS. 13 and 14. As this happens the blades also start to rotate in the desired direction as a result of the coning angle and the negative pitches imparted to the blades. As the speed of rotation increases the centrifugal forces imposed on the blades 14, 14 eventually cause them to move downwardly relative to the retaining links 34, 34 and about the flapping pins 38, 38 to bring the stop surface 41 out of engagement with stop screw 39. As this occurs the second synchronizing member 46 rotates relative to the first synchronizing member 40 so that the movements of the blades about the pins 38, 38 are synchronized and occur in unison. As the blades move downwardly, however, they also by virtue of the inclined pivot pins 38, 38 (or because of the delta-three angles) move toward more positive pitch angles which slow the speed of rotation. As a result of the delta-three angles and the freedom of the blades to pivot about the flapping axes provided by the pins 38, 38 a governing action is imposed on the speed of rotation, the governed speed being a function of the delta-three angles and the forward or longitudinal velocity of the device. Therefore, for any given velocity of the device the delta-three angles may be adjusted to bring the rotor speed to or below a given value.

Figure 16:
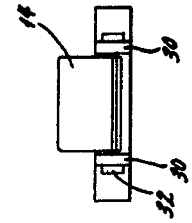
FIGS. 10, 12, 14 and 16 are schematic side elevational views corresponding respectively to FIGS. 9, 11, 13 and 15.

FIGS. 4, 15 and 16 show the device after retaining links 34, 34 are moved to the second positions corresponding generally to the fully deployed positions of the blades 14, 14. These positions are reached by moving the control rod still further upwardly from the position shown in FIG. 13 to still further raise the synchronizing members 40 and 46. At these fully deployed positions the retaining links 34, 34 extend generally horizontally or radially outwardly relative to the hub 20 and the delta-three angles are at their maximum value. So long as the retaining links 34, 34 are held in fixed positions relative to the hub by the coning control links 44, 44 the configuration and operation of the device is generally similar to a conventional hub and blade structure employing inclined or delta-three flapping axes. However, by moving the control links the delta-three axes may be shifted to meet different flight conditions.

Retraction of the blades is accomplished in the reverse procedure to that shown in FIGS. 9 through 16. That is, starting with the parts in the fully deployed positions of FIG. 15 the control rod 60 is moved generally downwardly to cause the retaining links 34, 34 to be pivoted toward larger coning angles and toward their original upright positions. As the retaining links 34, 34 are so pivoted the resulting upward movement of the flapping hinge pins 38, 38 causes the pitch of the blades to vary in such a manner that the speed of rotation is decreased. As the control rod 60 is moved to its fully lowered position the links 44, 44 return the retaining links 34, 34 to their initial upright positions and the blades are returned to their fully inactive positions.

The above described means for deploying the blades 14, 14 permits the same to be moved smoothly from their inactive to their fully deployed positions so that the deceleration forces and other loads applied to the blades and to the attached body are smoothly increased rather than applied as sudden shocks. Furthermore, the blades after once being moved to their fully deployed positions may be returned to their inactive positions while the device is in flight to provide for a type of control hitherto unavailable in rotary wing retarding devices. Also, instead of being moved to their fully deployed positions the blades 14, 14 may also be moved to intermediate positions such as shown in FIGS. 13 and 14 whereat the device operates in exactly the same manner as it does when fully deployed except for producing a smaller retarding force as may be sometimes desired.

The invention claimed is:

1. In an aerial device of the class described, the combination comprising a body adapted to carry a load, a hub connected with said body for rotation about a central axis, a plurality of blade retaining links connected with said hub at circumaxially spaced locations for pivotal movements relative to said hub about transverse coning axes tangent to a cylinder concentric with said central axis, a plurality of generally radial blades each of which blades is pivotally connected with a respective one of said retaining links for pivotal movements relative thereto about a flapping axis which is fixed relative to said retaining link at a fixed inclination relative to the assoicated coning axis, synchronizing means connected with said retaining links and movable relative to said coning axes for causing said retaining links to move in unison about said coning axes, and means connected with said synchronizing means for moving the same relative to said coning axes to permit adjustment of said retaining links to various desired positions about said coning axes.

2. In an aerial device of the class described, the combination comprising a body adapted to carry a load, a hub connected with said body for rotation about a central axis, a plurality of blade retaining links connected with said hub at circumaxially spaced locations for pivotal movements relative to said hub about transverse coning axes tangent to a cylinder concentric with said central axis and perpendicular to radial planes passing through said central axis, a plurality of generally radial blades each of which blades is pivotally connected with a respective one of said retaining links for pivotal movements relative thereto about a flapping axis which is fixed relative to said retaining links at a fixed inclination relative to the associated coning axis, synchronizing means connected with said retaining links and movable relative to said coning axes for causing said retaining links to move in unison about said coning axes, and means connected with said synchronizing means for moving the same relative to said coning axes to permit adjustment of said retaining links to various desired positions about said coning axes.

3. In an aerial device of the class described, the combination comprising a body adapted to carry a load, a hub connected with said body for rotation about a central axis in a predetermined direction, a plurality of blade retaining links connected with said hub at circumaxially spaced locations for pivotal movements relative to said hub about transverse coning axes tangent to a cylinder concentric with said central axis and perpendicular to radial planes passing through said central axis, a plurality of generally radial blades each of which blades is pivotally connected with a respective one of said retaining links for pivotal movements relative thereto about a flapping axis which is fixed relative to the associated coming axis and which is inclined relative to said associated coning axis at such an angle that as said hub rotates in said predetermined direction the angle of attack of said blade decreases as the blade moves about said flapping axis in a direction rearwardly toward said central axis and increases as said blade moves in the opposite direction, synchronizing means connected with said retaining links and movable relative to said coning axes for causing said retaining links to move in unison about said coning axes, and means connected with said synchronizing means for moving the same relative to said coning axes to permit adjustment of said retaining links to various desired positions about said coning axes.

4. In an aerial device of the class described, the combination comprising a body adapted to carry a load, a hollow shaft fixed to said body and having a central axis, a hub supported on said shaft for rotation about said central axis, a plurality of blade retaining links connected with said hub at circumaxially spaced locations for pivotal movements relative to said hub about transverse coning axes tangent to a cylinder concentric with said central axis, a plurality of generally radial blades pivotally connected respectively with said retaining links for pivotal movements relative to said retaining links about flapping axes which are inclined respectively relative to the associated coning axes, a synchronizing member carried by said hub and movable relative thereto, means connected with said synchronizing member and with said retaining links for causing the latter to move in unison about said coning axes in response to movement of said synchronizing member relative to said hub, a control rod extending through said hollow shaft, and means connecting said control rod with said synchronizing member for moving said synchronizing member relative to said hub to move said retaining links in unison in response to axial movement of said control rod.

5. The combination defined in claim 4 further characterized by means carried by said body and connected with said control rod for controlling the axial movement of said control rod.

6. In an aerial device of the class described, the combination comprising a body adapted to carry a load, a hub connected with said body for rotation about a central axis, a plurality of blade retaining links connected with said hub at circumaxially spaced locations for pivotal movements relative to said hub about transverse coning axes tangent to a cylinder concentric with said central axis, a plurality of generally radial blades each of which blades is connected with a respective one of said retaining links for pivotal movements relative thereto about a flapping axis which is fixed relative to said retaining links at a fixed inclination relative to the associated coning axis, an axially movable synchronizing member carried by said hub and rotatably fixed relative thereto, a plurality of coning control links each pivotally connected at one end to said synchronizing member and at its other end to a respective one of said retaining links so that said retaining links are moved in unison about said coning axes as a result of axial movement of said synchronizing member, and means for moving said synchronizing member axially relative to said hub to permit adjustment of said retaining links to various desired positions about said coning axes.

7. In an aerial device of the class described, the combination comprising a body adapted to carry a load, a hollow shaft fixed to said body and having a central axis, a hub supported on said shaft for rotation about said central axis, a plurality of blade retaining links connected with said hub at circumaxially spaced locations for pivotal movements relative to said hub about transverse coning axes tangent to a cylinder concentric with said central axis, a plurality of generally radial blades pivotally connected respectively with said retaining links for pivotal movements relative to said retaining links about flapping axes which are inclined respectively relative to the associated coning axes, an axially movable synchronizing member carried by said hub and rotatably fixed relative thereto, a plurality of coning control links each pivotally connected at one end to said synchronizing member and at its other end to a respective one of said retaining links so that said retaining links are moved in unison about said coning axes as a result of axial movement of said synchronizing member, a control rod extending through said hollow shaft, and means connecting said control rod with said synchronizing member for moving said synchronizing member axially relative to said hub to move said retaining links in unison in response to axial movement of said control rod.

8. In an aerial device of the class described, the combination comprising a body adapted to carry a load, a hub connected with said body for rotation about a central axis, a plurality of blade retaining links connected with said hub at circumaxially spaced locations for pivotal movements relative to said hub about transverse coning axes tangent to a cylinder concentric with said central axis, a plurality of generally radial blades pivotally connected respectively with said retaining links for pivotal movements relative to said retaining links about flapping axes which are fixed and inclined relative to the associated coning axes, and synchronizing means carried by said hub and connected with said retaining links and with said blades for causing said retaining links to move in unison about said coning axes and said blades to move in unison about said flapping axes.

9. In an aerial device of the class described, the combination comprising a body adapted to carry a load, a hub connected with said body for rotation about a central axis, a plurality of blade retaining links connected with said hub at circumaxially spaced locations for pivotal movements relative to said hub about transverse coning axes tangent to a cylinder concentric with said central axis, a plurality of generally radial blades pivotally connected respectively with said retaining links for pivotal movements relative to said retaining links about flapping axes which are fixed and inclined relative to the associated coning axes, a first synchronizing member carried by said hub and movable axially relative thereto, means connected with said member and with said retaining links for moving said links in unison about said coning axes in response to movement of said member axially of said hub, a second synchronizing member carried by said hub and rotatable relative thereto, and means connected with said second member and with said blades for moving said blades in unison about said flapping axes in response to rotative movement of said second member relative to said hub.

10. The combination defined in claim 9 further characterized by said second synchronizing member being axially fixed relative to said first synchronizing member so as to be axially movable relative to said hub in unison therewith.

11. In an aerial device of the class described, the combination comprising a body adapted to carry a load, a hub connected with said body for rotation about a central axis, a plurality of blade retaining links connected with said hub at circumaxially spaced locations for pivotal movements relative to said hub about transverse coning axes tangent to a cylinder concentric with said central axis, a plurality of generally radial blades pivotally connected respectively with said retaining links for pivotal movements relative to said retaining links about flapping axes which are inclined respectively relative to the associated coning axes, an axially movable synchronizing member carried by said hub and rotatably fixed relative thereto, a plurality of coning control links each pivotally connected at one end to said synchronizing member and at its other end to a respective one of said retaining links so that said retaining links are moved in unison about said coning axes as a result of axial movement of said synchronizing member, a second synchronizing member carried by said hub and rotatable relative thereto, and a plurality of flapping control links each universally connected at one end to a respective one of said blades and at its other end universally connected to said second synchronizing member for moving said blades about said flapping axes in response to rotative movement of said second synchronizing member relative to said hub.

12. The combination defined in claim 11 further characterized by said second synchronizing member being mounted on said axially movable synchronizing member for movement in rotation relative to said latter member and to said hub, and means for restraining said second synchronizing member against axial movement relative to said axially movable member so that said second member moves axially in unison with said axially movable member.

13. The combination defined in claim 12 further characterized by a hollow shaft fixed to said body and connected with said hub so as to support said hub for rotation about said central axis, a control rod axially movable in the bore of said hollow shaft, and means connecting said control rod to said axially movable member for moving said latter member axially in response to axial movement of said control rod.

14. In an aerial device of the class described, the combination comprising a body adapted to carry a load, a hub connected with said body for rotation about a central axis, a plurality of blade retaining links connected with said hub at circumaxially spaced locations for pivotal movements relative to said hub about first generally transverse axes fixed relative to said hub, a plurality of generally radial blades pivotally connected respectively with said retaining links for pivotal movements relative to said retaining links about second axes fixed relative to said retaining links, a first synchronizing member carried by said hub and movable axially relative thereto, means connected with said member and with said retaining links for moving said links in unison about said first axes in response to movements of said member axially of said hub, a second synchronizing member carried by said hub and rotatable relative thereto, a plurality of control links each universally connected at one end to said second member and at its other end universally connected to a respective one of said blades for moving said blades in unison about said second axes in response to rotative movement of said second member relative to said hub, and means for moving said second member axially in unison with said axially movable member.

15. In an aerial device of the class described, the combination comprising a body adapted to carry a load, a hub connected with said body for rotation about a central axis, a plurality of blades, means connecting said blades to said hub for movement between inactive positions generally parallel to said central axis and deployed positions generally radial to said central axis, said connecting means including a plurality of blade retaining links connected with said hub at circumaxially spaced locations for pivotal movements relative to said hub about transverse coning axes tangent to a cylinder concentric with said central axis and pivotally connected respectively with said blades to permit pivotal movements of said blades relative to said retaining links about flapping axes fixed relative to said retaining links and which links are moved between first and second positions relative to said hub and about said coning axes as said blades are moved between their inactive and deployed positions respectively, means for moving said retaining links in unison from their first to their second positions, and means for controlling the movement of said blades about said flapping axes during the initial portion of the movement of said retaining links from their first positions to their second positions and in such a manner that the outboard ends of said blades are gradually moved away from said central axis during said initial portion of the movement of said retaining links.

16. In an aerial device of the class described, the combination comprising a body adapted to carry a load, a hub connected with said body for rotation about a central axis, a plurality of blades, means connecting said blades to said hub for movement between inactive positions generally parallel to said central axis and deployed positions generally radial to said central axis, said connecting means including a plurality of blade retaining links connected with said hub at circumaxially spaced locations for pivotal movements relative to said hub about transverse coning axes tangent to a cylinder concentric with said central axis and pivotally connected respectively with said blades to permit pivotal movements of said blades relative to said retaining links about flapping axes fixed relative to said retaining links and which links are moved between first and second positions relative to said hub and about said coning axes as said blades are moved between their inactive and deployed positions respectively, means for moving said retaining links in unison from their first to their second positions, a synchronizing member supported for rotative movement relative to said hub, a plurality of flapping control links each universally connected at one end to a respective one of said blades and at its other end universally connected to said synchronizing member for moving said blades in unison about said flapping axes in response to rotation of said synchronizing member relative to said hub, means for moving said synchronizing member axially relative to said hub during the initial portion of the movement of said retaining links from their first to their second positions, and means defining at least one cam surface on said synchronizing member which cam surface is arranged to engage a corresponding one of said flapping control links during said initial portion of the movement of said retaining links and to rotate said synchronizing member in such a direction as to cause said flapping control links to gradually move the outboard ends of said blades away from said central axis.

17. The combination defined in claim 16 further characterized by stop means between at least one retaining link and its associated blade to limit the movement of said blades about said flapping axes in the direction toward said central axis.

18. The combination defined in claim 16 further characterized by said flapping axes being inclined relative to the associated coning axes.

19. In an aerial device of the class described, the combination comprising a body adapted to carry a load, a hub connected with said body for rotation about a central axis, a plurality of blades, means connecting said blades to said hub for movement between inactive positions generally parallel to said central axis and deployed positions generally radial to said central axis, said connecting means including a plurality of blade retaining links connected with said hub at circumaxially spaced locations for pivotal movements relative to said hub about transverse coning axes tangent to a cylinder concentric with said central axis and pivotally connected respectively with said blades to permit pivotal movements of said blades relative to said retaining links about flapping axes fixed relative to said retaining links and which links are moved between first and second positions relative to said hub and about said coning axes as said blades are moved between their inactive and deployed positions respectively, a first synchronizing member carried by said hub and axially movable relative thereto, a plurality of coning control links each connected at one end to said first synchronizing member and at its other end connected to a respective one of said retaining links for moving said retaining links in unison between their said first and second positions in response to axial movement of said first synchronizing member between first and second positions respectively relative to said hub, a second synchronizing member connected with said first synchronizing member for axial movement in unison therewith and for rotative movement relative thereto and relative to said hub, a plurality of flapping control links each universally connected at one end to a respective one of said blades and at its other end universally connected to second synchronizing member for moving said blades in unison about said flapping axes in response to rotation of said second synchronizing member relative to said hub, and means defining at least one cam surface on said second synchronizing member which cam surface is arranged to engage a corresponding one of said flapping control links during the initial portion of the movement of said first synchronizing member from its first toward its second position and to rotate said second synchronizing member in such a direction as to cause said flapping control links to gradually move the outboard ends of said blades away from said central axis.

20. The combination defined in claim 19 further characterized by a hollow shaft fixed to said body and connected with said hub so as to support said hub for rotation about said central axis, a control rod axially movable in the bore of said hollow shaft, and means connecting said control rod to said axially movable member for moving said latter member axially in response to axial movement of said control rod.

21. In an aerial device for the class described, the combination comprising a hub adapted for connection to a body and for rotation relative to said body about a central axis, a link having an inboard end connected with said hub for pivotal movement about a first axis substantially perpendicular to a radial plane, a generally radially outwardly extending blade pivotally connected at its inboard end to the outboard end of said link for pivotal movement relative to said link about a second axis fixed relative to said first axis and which projected on a plane normal to said central axis is disposed in said plane at an angle, referred to as a delta-three angle, to a line perpendicular to said radial plane, and mens for controllably moving said link about said first axis and relative to said hub so as to vary the delta-three angle.

22. The combination defined in claim 1 further characterized by each of said retaining links being movable at least approximately 90° about its associated coning axis between a position at which it extends generally radially outwardly relative to said central axis and another position at which it extends generally rearwardly from its associated coning axis and parallel to said central axis, and said means for moving said synchronizing means being effective to permit selective adjustment of said retaining links between said two positions.

23. The combination defined in claim 8 further characterized by each of said retaining links being movable at least approximately 90° about its associated coning axis between a position at which it extends generally radially outwardly relative to said central axis and another position at which it extends generally rearwardly from its associated coning axis and parallel to said central axis.

24. In an aerial device of the class described, the combination comprising a body adapted to carry a load, a hub connected with said body for rotation about a central axis, a plurality of blade retaining links connected wtih said hub at circumaxially spaced locations for pivotal movements relative to said hub about first axes each of which is fixed relative to said hub and to the associated retaining link, a plurality of generally radial blades each of which is pivotally connected to a respective one of said retaining links for movement relative thereto about a second axis fixed relative to said retaining link and to said blade, a first synchronizing member carried by said hub and movable axially relative thereto, means connected with said member and with said retaining links for moving said links in unison about said first axes in response to movement of said member axially of said hub, a second synchronizing member carried by said hub, said second synchronizing member being rotatable relative to said hub and to said first synchronizing member and being axially fixed relative to said first synchronizing member so as to be axially movable relative to said hub in unison with said first synchronizing member, and means connected with said second synchronizing member and with said blades for moving said blades in unison about said second axes in response to rotative movement of said second synchronizing member relative to said hub.

References Cited by the Examiner

UNITED STATES PATENTS

| | | | |
|---|---|---|---|
| 2,192,492 | 3/40 | Bennett | 170—160.56 |
| 2,440,293 | 4/48 | Stanley | 244—138 |
| 2,529,966 | 11/50 | Rozas | 244—138 |
| 3,016,217 | 1/62 | Polleys et al. | 244—138 |
| 3,017,147 | 1/62 | Robinson et al. | 244—138 |

FERGUS S. MIDDLETON, *Primary Examiner.*